3,224,863
VEGETATION CONTROL WITH UNSATURATED HYDROCARBON ESTERS OF N,N-DISUBSTITUTED THIONOCARBAMIC ACIDS
John J. D'Amico, Charleston, W. Va., assignor to Monsanto Company, a corporation of Delaware
No Drawing. Filed June 13, 1962, Ser. No. 202,104
9 Claims. (Cl. 71—2.5)

This application is a continuation-in-part of copending application Serial No. 721,362, filed March 14, 1958, now abandoned.

The present invention relates to alkenyl esters of diacyclicthionocarbamic acids, to herbicidal compositions containing them and to methods for controlling or destroying vegetation employing the new herbicides.

It has been found that compounds conforming to the structure

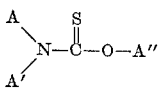

comprise a valuable family of herbicides, where A and A' are preferably the same or different acyclic radicals including alkoxy and halogen substituted derivatives thereof, cyclohexenyl, cyclohexyl, phenyl, or together constitute a divalent hydrocarbon radical of 5–8 carbon atoms inclusive forming with the nitrogen a heterocyclic ring of at least 6 but not more than 7 ring members and A" represents cyclohexenyl or a lower alkenyl radical. By alkenyl group is meant an open chain unsaturated radical containing one double bond. A and A' include alkyl but are preferably lower alkyl, alkoxy substituted lower alkyl, halogen substituted lower alkenyl and lower monoolefinic hydrocarbon radicals all of which should contain at least two carbon atoms. Examples of A and A' comprise 2-chloroallyl, 2-bromoallyl, 2,3-dichloroallyl, 3-chloroallyl, 3-chlorobutenyl, isopropyl, butyl, isobutyl, 2-butenyl, amyl, ethoxypropyl, methoxypropyl, allyl, cyclohexyl and phenyl. Not more than one of A and A' should be carbocyclic. Examples of A" are vinyl, allyl, methallyl and cyclohexenyl.

The new toxicants may be prepared by several methods. A lower alkenyl alcohol may be condensed with an N,N-dilower acylic thiocarbamyl chloride with or without an HCl acceptor, as for example pyridine, triethylamine or potassium carbonate. Alternatively, a lower alkenyl xanthate may be condensed with sodium monochloroacetate and the product treated with a dilower acyclic amine. Vinyl esters are obtained by condensing an alkali metal salt of the corresponding thionocarbamic acid with acetylene. The following examples illustrate the preparation:

*Example 1*

To 240.5 parts by weight (5.0 moles) of allyl alcohol was added in one portion 179.7 parts by weight (1.0 mole) of dipropyl thiocarbamyl chloride. The exothermic reaction caused a rise in temperature from 28 to 65° C. in two minutes. The stirred reaction mixture was then heated at reflux temperature for 24 hours, cooled to 25° C. and then filtered to remove any insoluble impurities. The excess alcohol was removed by distillation. Vacuum distillation of the residue gave a 25.4% yield of allyl dipropylthionocarbamate as an amber liquid, B.P. 130–132° C./6 mm. Analysis gave 6.6% nitrogen as compared to 7.0% calculated for $C_{10}H_{19}NOS$.

The most satisfactory and preferred procedure was carried out as follows: To a stirred solution of 47.1 parts by weight (0.255 mole) of sodium carbonate in 200 parts by weight of water was added 47.3 parts by weight (0.5 mole) of monochloroacetic acid to form a solution having a pH of 8. The addition was carried out at a temperature of 10–20° C. over a ten minute period. Stirring was continued for 15 minutes and then 86 parts by weight (0.5 mole) of potassium allylxanthate was added in one portion. The reaction mixture was stirred for 1½ hours at 15–30° C. then cooled to 10° C. and 60.8 parts by weight (0.6 mole) of dipropylamine added in one portion. The reaction mixture was stirred for 5 hours while maintaining the temperature at 25–30° C. The organic layer which separated was then heated in vacuo (14 mm.) at a maximum temperature of 60° C. for 3 hours and filtered. This gave a 72.9% yield of allyldipropylthionocarbamate as an amber liquid. It contained 7.0% nitrogen and 16.3% sulfur as compared to 7.0% nitrogen and 15.9% sulfur calculated for $C_{10}H_{19}NOS$.

*Example 2*

In this example, 151.7 parts by weight (1.0 mole) of diethyl thiocarbamyl chloride was substituted for the dipropyl thiocarbamyl chloride in the process described in the first paragraph of Example 1. The exothermic reaction caused a temperature rise from 25 to 60° C. in two minutes. The stirred reaction mixture was then heated at 80–90° C. for 24 hours, cooled to 25° C. and then filtered to remove any insoluble impurities. The excess alcohol was removed by distillation. Vacuum distillation of the residue gave an 18.5% yield of allyl diethylthionocarbamate as an amber liquid, B.P. 105–107° C./10 mm. Analysis gave 8.0% nitrogen as compared to 8.1% calculated for $C_8H_{15}NOS$.

The same compound was prepared in 53% yield by the method described in the second paragraph of Example 1 substitutinng 43.9 parts by weight of diethylamine for the dipropylamine.

The compounds of the class defined are particularly valuable as pre-emergent herbicides, but are also somewhat toxic to foliage and in some cases severely toxic to foliage. By application to vegetation is meant either application to the soil before the plants emerge whereby the toxicant is brought into contact with germinating seedlings or to the foliage. The toxicants may be applied to the soil or to foliage conveniently in the form of a spray containing the active ingredient. For pre-emergence application amounts within the range of 1 to 60 pounds per acre are recommended. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzene-sulfonate, or an amine salt of dodecylbenzenesulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided solid carrier, as for example talc, clay, pyrophyllite, silica and fuller's earth. Alternatively, the dry compositions may be dispersed in water and applied as a spray.

Examples of the new toxicants comprise allyl N-isopropyl-N-allylthionocarbamate, allyl diisopropylthionocarbamate, allyl N-2-chloroallyl-N-isopropylthionocarbamate, allyl N-2-chloroallyl-N-3-methoxypropylthionocarbamate, allyl diallylthionocarbamate, allyl dibutylthionocarbamate, methallyl diethylthionocarbamate, methallyl diisopropylthionocarbamate, methallyl N-isopropyl-N-allylthionocarbamate, methallyl diallylthionocarbamate, vinyl dibutylthionocarbamate, allyl 1-piperidinecarbothionate, allyl 5-ethyl-2-methyl 1-piperidine-carbothionate, allyl 1-hexamethyleniminecarbothionate, 2-cyclohexenyl diethylthionocarbamate, allyl N-2-bromoallyl- N-isopropylthionocarbamate, allyl N-phenyl-N-methyl-thionocarbamate, allyl N-phenyl-N-ethylthionocarbamate, allyl N-cyclohexyl-N-methylthionocarbamate, allyl N-cyclohexyl-N-ethylthionocarbamate, allyl N-cyclohexyl-N-propylthionocarbamate and allyl N-cyclohexyl-N-isopropylthionocarbamate. Also useful although not preferred is allyl N-cyclohexyl-N-butylthionocarbamate.

Table I illustrates the pre-emergent herbicidal use of typical alkenyl thionocarbamates. The ester was emulsified in water and applied as an aqueous spray. In this manner, the active ingredient at a dosage of 5 pounds per acre was applied to the soil of seeded plots before the plants emerged. For convenience in recording the results a numerical rating system was used in which 0 indicated no phytotoxicity, 1 slightly toxic, 2 moderately toxic and 3 severely toxic. The data illustrated the severe toxicity of the alkenyl thionocarbamates to typical grasses. The criticality of the size of the groups on the nitrogen and unsaturation in the ester group is demonstrated by the fact that neither allyl dimethylthionocarbamate nor ethyl dipropylthionocarbamate exerted any toxicity toward the same plants under identical conditions.

TABLE I

| Active ingredient | Phytotoxicity | | |
|---|---|---|---|
| | Wild oats | Rye grass | Crab grass |
| Allyl dimethylthoinocarbamate | 0 | 0 | 0 |
| Allyl diethylthionocarbamate | 3 | 3 | 2 |
| Allyl dipropylthionocarbamate | 1 | 3 | 2 |
| Allyl 1-hexamethylenimine-carbothionate | 3 | 3 | 3 |
| Allyl N-cyclohexyl-N-methyl-thionocarbamate | 3 | 3 | 3 |
| Allyl N-cyclohexyl-N-ethylthionocarbamate | 3 | 3 | 3 |
| Ethyl dipropylthionocarbamate | 0 | 0 | 0 |

Additionally, it was observed that allyl dipropylthionocarbamate applied as a 0.5% aqueous spray to grass foliage was severely phytotoxic thereto.

It is intended to cover all changes and modifications of the examples of the invention herein chosen for purposes of disclosure which do not constitute departures from the spirit and scope of the invention.

What is claimed is:

1. The method of destroying vegetation which comprises applying thereto a phytotoxic amount of a composition containing as an essential active ingredient an unsaturated ester of a disubstituted thionocarbamic acid containing a total of at least four carbon atoms in the said substituents, the substituents being selected from a group consisting of cyclohexenyl, cyclohexyl, lower alkyl, alkoxy substituted lower alkyl, lower alkenyl, halogen substituted lower alkenyl, phenyl and alkylene of five to eight carbon atoms inclusive which with the nitrogen form a heterocyclic ring containing at least six but no more than seven ring members and the ester radical being selected from the group consisting of cyclohexenyl and lower alkenyl.

2. The method of destroying vegetation which comprises applying to germinating grass seedlings a phytotoxic amount of a composition containing as the essential active ingredient a compound of the structure

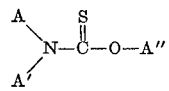

where A and A' represent alkyl containing at least two but not more than three carbon atoms and A" represents lower hydrocarbon alkenyl.

3. The method of destroying vegetation which comprises applying to germinating grass seedlings a phytotoxic amount of a composition containing as the essential active ingredient a compound of the structure

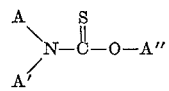

where A represents cyclohexyl, A' represents alkyl of one to three carbon atoms inclusive and A" represents allyl.

4. The method of destroying vegetation which comprises applying to germinating grass seedlings a phytotoxic amount of a composition containing as the essential active ingredient a compound of the structure

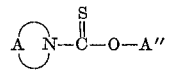

where A, A' and A" represent lower monolefinic acyclic hydrocarbon.

5. The method of destroying vegetation which comprises applying to germinating grass seedlings a phytotoxic amount of a composition containing as the essential active ingredient a compound of the structure

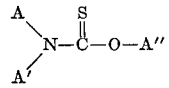

where A is alkylene containing at least five but not more than eight carbon atoms forming with the nitrogen a heterocycle of at least six but not more than seven ring members and A" represents lower monoolefinic acyclic hydrocarbon.

6. The method of destroying grasses which comprises applying thereto a phytotoxic amount of a composition containing as the essential active ingredient allyl dipropylthionocarbamate.

7. The method of destroying vegetatation which comprises applying to germinating grass seedlings a phytotoxic amount of a comopsition containing as the essential active ingredient allyl diethylthionocarbamate.

8. The method of destroying vegetation which comprises applying to germinating grass seedlings a phytotoxic amount of a composition containing as the essential active ingredient allyl N-cyclohexyl-N-methylthionocarbamate.

9. The method of destroying vegetation which comprises applying to germinating grass seedling a phytotoxic amount of a composition containing as the essential active ingredient allyl N-cyclohexyl-N-ethylthionocarbamate.

References Cited by the Examiner

UNITED STATES PATENTS

| | | | |
|---|---|---|---|
| 2,650,876 | 9/1953 | Stewart | 71—2.7 |
| 2,863,899 | 12/1958 | Harris. | |
| 2,919,182 | 12/1959 | Harman et al. | 71—2.7 |
| 2,984,559 | 5/1961 | D'Amico | 71—2.7 |
| 2,992,091 | 7/1961 | Harman et al. | 71—2.6 |
| 3,066,021 | 11/1962 | Beaver et al. | 71—2.6 |
| 3,126,270 | 3/1964 | Harman et al. | 71—2.6 X |

LEWIS GOTTS, *Primary Examiner.*

JULIAN S. LEVITT, *Examiner.*